May 15, 1923.   A. NELSON   1,455,146
SIGNAL DEVICE FOR TIRE VALVES
Filed May 19, 1922
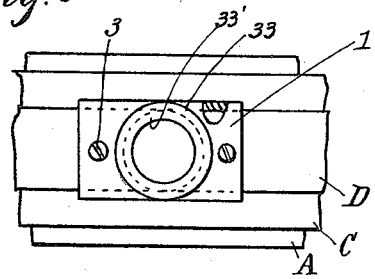
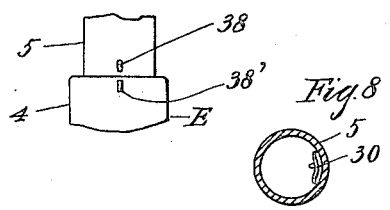
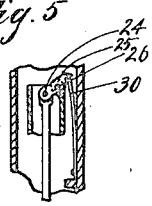
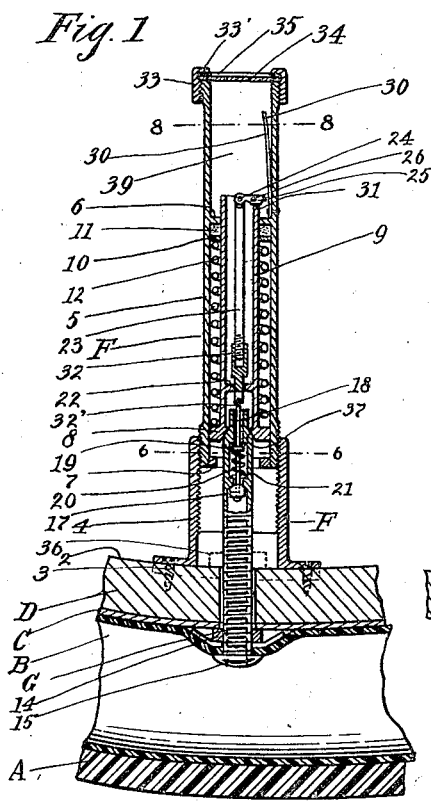
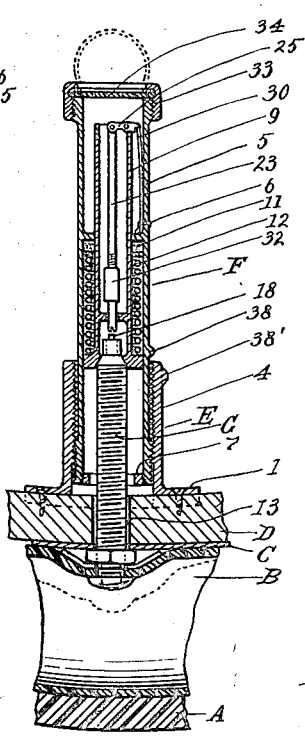
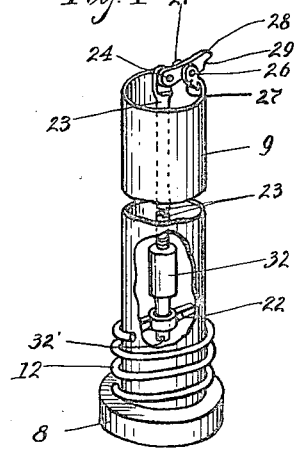
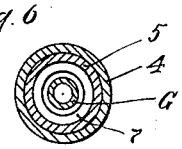
Inventor,
Albert Nelson
by H. S. Johnson
his Attorney.

Patented May 15, 1923.

1,455,146

UNITED STATES PATENT OFFICE.

ALBERT NELSON, OF WHEATON, MINNESOTA.

SIGNAL DEVICE FOR TIRE VALVES.

Application filed May 19, 1922. Serial No. 562,139.

*To all whom it may concern:*

Be it known that I, ALBERT NELSON, a citizen of the United States, residing at Wheaton, in the county of Traverse and State of Minnesota, have invented certain new and useful Improvements in Signal Devices for Tire Valves, of which the following is a specification.

This invention relates to signal devices for automobile tires, and has for one of its objects to provide efficient tire valve alarm mechanism which is carried by the rim of the wheel and loosely engages with the tire valve and completely encases the latter to protect it against injury.

Among the advantages of this arrangement are quick and easy application of the device to ordinary wooden rimmed automobile wheels; loose engagement with the ordinary tire valve so as to require no special fitting, and very effective protection against the elements.

A further object of the invention is the provision of signal means which is rendered sensitively operative, responsive to a slight variation from a normal predetermined resistance of the inner tube against external indentation, when the variation of resistance results from a gradually reducing internal tire pressure due to a leak. By utilizing this variation of resistance I am enabled to use a relatively small entirely enclosed device effectively protected against mud, and which is initially actuated solely from the inner tube and the bodily movement of the valve thereof. Thus I secure a positive movement as distinguished from those signal devices of the class described which depend for their actuation, upon mechanism directly operated by the escaping air.

A still further object of the invention is the provision of novel sound producing means associated with tire valve controlling mechanism, said means being rendered effective by the pressure generated by the escaping air.

Other advantages will be pointed out, as this specification progresses, the invention consisting of the features of construction, combination and arrangement of parts hereinafter described and claimed.

In the accompanying drawings:—

Figure 1, is a vertical longitudinal sectional view of a section of an automobile wheel showing my improved signal device mounted thereon.

Fig. 2, is a similar view, showing the parts set in operative position ready to respond to a deflating action in the tire.

Fig. 3, is a top view of Figure 1.

Fig. 4, is a perspective view drawn to an enlarged scale, of the piston and the valve manipulating mechanism carried thereby.

Fig. 5, is an enlarged view of the upper portion of Fig. 2, showing part of the valve manipulating mechanism in one of its operating positions.

Fig. 6, is a sectional view on line 6—6 of Fig. 1.

Fig. 7, is a side view of a section of Fig. 2, taken at a point intermediate its ends, and Fig. 8, is a section on line 8—8 of Fig. 1.

A designates the tire casing, B the inner tube, C the usual steel tire rim and D the felloe of an ordinary automobile wheel, C and D constituting the rim of the wheel.

The invention comprises the base or supporting member E, and the automatically actuated alarm mechanism F, movably supported on the member E and extending radially in the plane of the wheel. The base consists of an oblong flange 1, adapted to be fastened to the inner face 2 of the felloe as by means of the screws 3, and a cylindrical hub 4, interiorly threaded and extending radially from the flange. Threaded in the hub is the tubular casing 5, open at its ends and preferably of uniform internal diameter and formed internally with a radial flange 6 located intermediate its ends. The lower end of the casing is provided with an internal removable stop collar 7 threaded in the casing for a purpose hereinafter to be explained.

Slidable in the casing is the piston head 8, having a relatively long tubular extension 9 surrounded by the flange 6 and slidable therein. For the purpose of securing an air tight joint between the extension and the flange 6, I provide a washer 10 loosely fitting between the extension and the casing and suitable packing material 11 between the flange and washer. An extensile coil spring 12 between the washer and the piston head urges the latter against the collar 7, and also compresses the packing to effect an air tight sliding joint between the tubular extension and the casing.

G designates an ordinary hollow externally threaded tire valve body, which extends radially loosely through an opening 13 in the felloe, and has a nut 14 and head 15, between which the wall of the inner tube is gripped to form an air tight connection. The valve body, as here shown, is tubular and communicates with the interior of the tube. A check valve 17, having a stem 18 extending slightly beyond the top of the valve body, serves as an inlet for inflating the inner tube. The valve stem as here shown, is formed with a collar 19, which engages with the extensile coil spring 20, which latter rests on the internal annular shoulder 21 of the valve body. As the valve fits loosely in the body, air forced into the top thereof will unseat the valve 17 against the stress of the spring. Obviously, a depressing action upon the protruding portion of the stem 18, will also unseat the valve and permit air from the inner tube to escape, and thereby reduce the usual working pressure carried therein, which will hereinafter be referred to as the normal pressure.

Referring to the tubular extension 9, a cross support 22 spaced slightly from the piston head, slidably supports the push rod 23, which latter extends to the top of the extension and has pivotal connection 24 with the inner end of the trip lever 25. This trip lever swings upwardly and is fulcrumed as by means of the pivot 26 in a pair of lugs 27, which latter extend inwardly from the edge of the tube forming the extension, to thereby offset the pivot inwardly from the tube wall so as to permit the inner end of the lever to dip deeply into the interior of the extension when moved upon its pivot, as is clearly shown in Figure 5 of the drawings.

The outer end of the lever is beveled outwardly and downwardly at 28, and is formed with a notch 29.

Secured on the inner side of the extension is the upwardly and outwardly extending spring tongue 30, the top of which extends into the vertical path of the lever, when the piston travels upwardly in the casing 5. As the lever is beveled at 28, it will frictionally engage the spring during a part of its upward travel, and flex the latter toward the wall of the tube until the end of the spring engages the notch 29 as shown in Figure 2. The lever is further formed with a straight lower edge 31, which rests on the edge of the upper extension, when the lever is in horizontal position (Fig. 2) whereby the upward movement of the push rod is restricted. The push rod is preferably formed of two sections, the lower section being formed with an internally threaded sleeve 32, having threaded engagement with the upper section whereby the rod is rendered longitudinally adjustable.

By engaging the slot 32′ in the end of the rod with a suitable tool, the rod may be adjusted so as to properly engage the valve rod 18. The top of the casing is externally threaded to receive the ring 33, the latter being formed with a radial flange 33′ which overlaps the top flat edge of the casing. Closing the top opening of the casing and overlapping the top edge thereof, and adapted to be firmly clamped in position thereon by the ring 3, is the elastic disk 34, a metal washer 35 being interposed between the flange of the ring and disk, to facilitate the clamping operation. The piston is formed with a suitable seat 37 which loosely engages the usual valve shoulder or seat of the valve body.

In the process of applying the device, the usual valve body nut 36 indicated in dotted lines in Figure 1, is removed to permit the body of the valve to be pressed longitudinally against the inflated inner tube thereby tending to compress the latter.

The supporting base is now fastened to the felloe so that its hub will be concentric with the valve body. The casting containing the alarm mechanism, is now screwed into the hub of the base until it assumes approximately the position indicated in Figure 2.

As the tire is inflated to register a normal working pressure, the coil spring 12 will be compressed under stress, thus pressing the piston head against the valve body, which latter in turn, tends to indent the inner tube.

Further, concurrently with the downward movement of the casing, the piston travels upwardly therein, thereby causing the lever 25 to frictionally engage the upper portion of the spring tongue 30, and come to rest on the top thereof, as shown in Figure 2. Obviously, the relative position of the piston with respect to the valve body remains unchanged during the movement of the casing, this being best indicated by the relative position of the ends of the push rod and the valve stem.

On the outside of the casing and base are the small lugs 38 and 38′ respectively, which lugs are in vertical alinement when the lever and spring tongue are in proper radial alinement, whereby, when the casing is being screwed into the base, the lugs serve as markers to indicate that the lever and spring are in proper relative position. If now the pressure in the tire falls below the normal as the result of a leak, the ratio between the normal resistance of the inner tube opposing indentation thereof and the pressure of the coil spring 12 will accordingly vary, with the result, that the tire will become slightly indented by the downwardly pressing valve body, as indicated in dotted lines in Figure 2. This indentation will cause the piston to descend and thereby cause the lever 25 to rock upon its pivot 26 and fulcrum on the end of the spring tongue, which in turn will move the push rod and thereby push the valve stem 18 downward. By thus unseating the valve, air from the inner tube is released into the chamber 39, which latter is formed by the elastic rubber closure 34 and the air tight joint formed by the packing 11. As the elastic closure is not sufficiently strong to withstand the pressure of the air, it will stretch into spherical form and burst with a loud report somewhat after the manner of toy balloons and constitute a signal to the driver of the car.

It is to be noted, that after the rupture of the closure, the piston continues to descend. Downward pressure on the push rod now ceases and the spring 20 returns the valve 17 to its seat.

Thus, I secure the advantage of closing the valve immediately after the alarm has taken place, and conserve what air pressure remains in the inner tube.

I claim:

1. In a device of the class described, the combination with the rim of an automobile wheel, an inflatable tire thereon, and a tire valve in connection with said tire, said tire valve extending radially through said wheel rim and being bodily movable longitudinally thereon and having a check valve whereby to release air from said tire when the check valve is actuated; of a casing open at the top supported on said wheel rim and loosely surrounding said tire valve to receive air therefrom, when the check valve thereof is actuated, a hollow piston slidable in said casing resting on said tire valve, means for urging the piston toward the tire valve to press the latter against the tire, means carried partly by the piston and partly by said casing constructed to operatively engage said check valve to actuate it responsive to a piston movement, said means including a fulcrumed lever carried by the piston, a reciprocatory rod in the hollow of said piston connected to one end of said lever and extending to said check valve to engage the latter when reciprocated to actuate said valve, and a blade spring carried by said casing and adapted to engage the other end of said lever for a predetermined period of time during a piston movement to actuate said reciprocatory rod, and a closure for the open top of said casing, said closure being formed of material which will stretch and fracture under the pressure in the tire when the latter is partially deflated.

2. In a device of the class described, the combination with the rim of an automobile wheel, an inflatable tire thereon, and a tire valve having a discharge valve in connection with said tire said tire valve extending radially through said wheel rim and being bodily movable longitudinally thereon, and having a check valve whereby to release air from said tire when the check valve is actuated; of a casing open at the top supported on said wheel rim and loosely surrounding said tire valve to receive air therefrom, when the check valve thereof is actuated, a piston slidable in said casing resting on said tire valve, means for urging the piston toward the tire valve to press the latter against the tire, a closure of elastic material for the open top of said casing proportioned to fracture when subjected to the pressure in the tire, when the latter is partially deflated, a reciprocatory rod carried by the piston and engageable by the discharge valve of said tire valve to open it concurrently with a piston movement, means carried by the casing in the path of said piston and adapted to engage with said rod during a portion of a piston movement for actuating said rod, means for urging the piston toward the tire valve to press the latter against the tire, and adjusting means for extending or contracting said reciprocatory rod for the purpose set forth.

3. In a device of the class described, the combination with the rim of an automobile wheel having an inflatable tire thereon, and a tire valve in connection with said tire, said tire valve extending radially through said wheel rim and being bodily movable longitudinally thereon, and having a check valve whereby to release air from said tire when the check valve is actuated; of a casing open at the top supported on said wheel rim and loosely surrounding said tire valve to receive air therefrom, when the check valve thereof is actuated, a piston slidable in said casing resting on said tire valve means for urging the piston toward the tire valve to press the latter against the tire, a reciprocatory rod carried by the piston and engageable by the check valve of said tire valve to open it concurrently with a piston movement, means carried by the casing in the path of said piston and adapted to engage with said rod during a portion of the piston movement for actuating said rod, and a ring threaded on the top of said casing, and having an inwardly extending radial flange overlapping the top edge of said casing, whereby an elastic disk cover may be readily removably secured between said radial flange and the casing.

4. The combination with a wheel rim and a tire valve, projected radially loosely therethrough and being operatively connected to an inflatable tire carried by said rim, and formed with an upwardly facing annular shoulder near its top and having an air discharge valve and an actuating stem therefor, an elongated cylindrical casing carried by the rim completely enclosing the tire valve, said casing having a soft rubber top wall, adapted to fracture under the pressure in the tire, a tubular open ended piston slidable longitudinally in said casing, the lower open end of the piston resting on said annular shoulder to form an air-tight joint therewith, means for urging the tire valve against the inflatable tire, said piston dividing the interior of said casing into an upper and lower chamber, the hollow of said piston being in open communication with said upper chamber and adapted to receive the discharge from said discharge valve, a member carried by the piston pivotally mounted in a manner to be movable therein to actuate said actuating stem when said member is moved, a stationary member carried by the casing to engage with said member to move it during a piston movement, and a construction whereby the casing may be extended or contracted lengthwise.

5. A tire valve signal device for tire valves having discharge valves and which are bodily movable radially of the wheel so that when the tire is deflated the valve may be bodily pushed into the interior of the tire casing; of a casing surrounding the tire valve, and having a soft rubber upper wall, adapted to fracture when subjected to the air pressure in the tire, a piston slidable longitudinally in the casing, said piston having a passage way which communicates with the discharge end of the tire valve and the interior of the casing above the piston, means for urging the piston against said tire valve to press the latter against the tire, and mechanism moving bodily with the piston and carried thereby and movable relative thereto and engageable by said discharge valve to actuate the latter concurrently with a piston movement, said mechanism including a rod extending to a part carried by the casing and engaging therewith at a predetermined point in the stroke of the piston to cause said rod to move relative to the piston and in piston moving direction.

6. A tire valve signal device for tire valves having a discharge valve which discharge valve is bodily movable radially of the wheel so that when the tire is deflated the valve may be bodily pushed into the tire casing; of a casing surrounding the tire valve and having a removable resilient top wall, a piston slidable in said casing resting on the tire valve, an air duct leading from the discharge end of said tire valve to the interior of the casing above the piston, means for urging the piston to press the tire valve toward the tire, and a reciprocatory rod carried by the piston and engageable by the discharge valve of the tire valve to open it concurrently with a piston movement, and means carried by the casing in the path of said piston and adapted to engage with said rod during a portion of a piston movement for actuating said rod.

In testimony whereof I affix my signature.

ALBERT NELSON.